US009476232B1

(12) United States Patent
Verdecia et al.

(10) Patent No.: US 9,476,232 B1
(45) Date of Patent: Oct. 25, 2016

(54) REMOTE SWITCH CONTROLLER

(71) Applicants: Roberto Verdecia, Miami, FL (US); Allexy Verdecia, Homestead, FL (US)

(72) Inventors: Roberto Verdecia, Miami, FL (US); Allexy Verdecia, Homestead, FL (US)

( * ) Notice: Subject to any disclaimer, the term of this patent is extended or adjusted under 35 U.S.C. 154(b) by 0 days.

(21) Appl. No.: 14/982,470

(22) Filed: Dec. 29, 2015

(51) Int. Cl.

| | |
|---|---|
| ***B60R 25/00*** | (2013.01) |
| ***E05B 49/04*** | (2006.01) |
| ***E05B 81/16*** | (2014.01) |
| ***E05B 47/00*** | (2006.01) |
| ***E05B 81/04*** | (2014.01) |
| ***B60R 25/021*** | (2013.01) |

(52) U.S. Cl.
CPC ......... *E05B 81/16* (2013.01); *B60R 25/02115* (2013.01); *E05B 47/0001* (2013.01); *E05B 81/04* (2013.01); *E05B 2047/0017* (2013.01); *E05B 2047/0036* (2013.01); *E05B 2047/0072* (2013.01); *E05B 2047/0083* (2013.01); *E05B 2047/0088* (2013.01); *E05B 2047/0091* (2013.01); *E05B 2047/0094* (2013.01)

(58) Field of Classification Search
CPC ............... E05B 47/00; E05B 47/0001; E05B 47/0012; E05B 47/0014; E05B 47/0015; E05B 47/0017; E05B 47/0036; E05B 2047/0017; E05B 2047/0036; E05B 2047/0072; E05B 2047/0083; E05B 2047/0091; E05B 2047/0094; E05B 81/00; E05B 81/04; E05B 81/06; E05B 81/16
See application file for complete search history.

(56) References Cited

U.S. PATENT DOCUMENTS

| | | | | |
|---|---|---|---|---|
| 2,591,618 | A * | 4/1952 | Schaeffer ............ | F02N 11/0807 123/179.2 |
| 3,948,069 | A * | 4/1976 | Imbriano ............. | B60R 25/023 70/418 |
| 5,343,721 | A * | 9/1994 | Calnen ................. | E05B 67/003 70/18 |
| 5,678,436 | A * | 10/1997 | Alexander .......... | E05B 47/0012 70/256 |
| 6,216,502 | B1 * | 4/2001 | Cannella ............. | E05B 47/0012 292/142 |
| 6,396,388 | B1 * | 5/2002 | Dong ..................... | B60R 25/04 123/179.1 |
| 6,701,760 | B1 * | 3/2004 | Elliason .................. | E05B 19/00 70/252 |
| 6,877,347 | B2 * | 4/2005 | Elliason .................. | E05B 19/00 70/252 |
| 7,373,795 | B2 * | 5/2008 | Kilbourne ........... | E05B 47/0012 292/244 |
| 8,869,574 | B2 * | 10/2014 | Schmidt-Lackner . | E05B 17/147 292/244 |
| 2014/0245798 | A1 * | 9/2014 | Beckman ............... | E05B 19/00 70/14 |

* cited by examiner

*Primary Examiner* — Christopher Boswell
(74) *Attorney, Agent, or Firm* — Christopher J Van Dam, PA; Chris Vandam

(57) ABSTRACT

A wireless remote control system and method for activating a switch including a transmitter assembly and a receiver assembly. The receiver assembly attaches to and is stabilized by connecting a flex rod to an object near the switch. The receiver assembly includes a servo that connects to an object, such as a key or switch. The transmitter assembly can send differing signals to cause the servo to take alternate actions.

2 Claims, 3 Drawing Sheets

REMOTE SWITCH CONTROLLER

BACKGROUND OF THE INVENTION

1. Field of the Invention

The present invention relates to wireless remote control devices, and more particularly, to wireless remotely controlled switch controller.

2. Description of the Related Art

Several designs for remotely activating a switch have been designed in the past. None of them, however, includes a design that wirelessly can allow the user to activate a variety of switches, keys and knobs with dexterity provided by a mechanical hand with fingers that also includes a means to quickly, easily and without marring adjacent surfaces can be applied to a wide variety of situations and uses.

Applicant believes that the closest reference corresponds to U.S. Pat. No. 6,877,347 issued to Elliason. However, it differs from the present invention because Elliason provides for a device that is limited to use with a thin metal key with a tethered physical remote linkage. These design limitations do not allow use with a variety of different keys and also requires a cumbersome attachment method while requiring the controller to be a limited distance from the active end of the device.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a wireless device to remotely control a variety of switches, knobs and keys.

It is another object of this invention to provide a mechanic or repairman the ability to remotely manipulate a device at long or short distances.

It is still another object of the present invention to provide a wireless device that does not require draping a connecting cord that could mar surfaces while at an active end does not require cumbersome connections to the switch.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
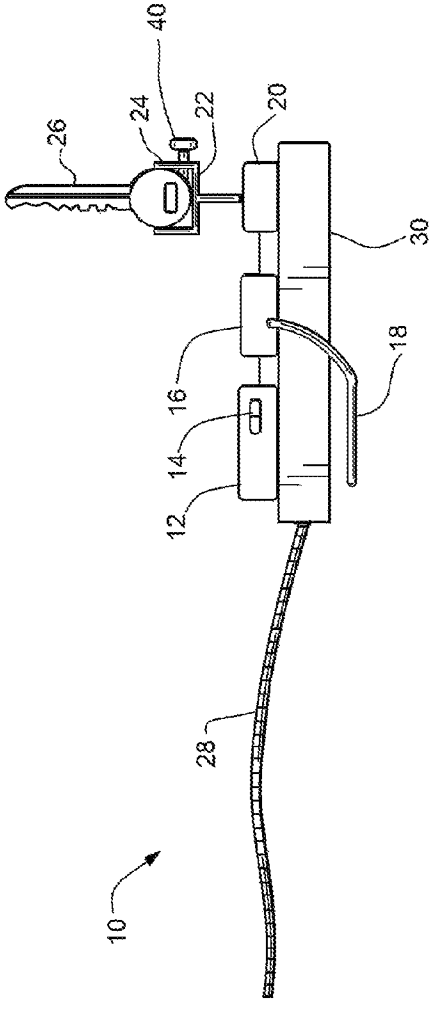
FIG. 1 shows an elevational view of a remote switch controller.

The subject device and method of use is sometimes referred to as the device, the invention, the remote controller, the switch controller, machine or other similar terms. These terms may be used interchangeably as context requires and from use the intent becomes apparent. The masculine can sometimes refer to the feminine and neuter and vice versa. The plural may include the singular and singular the plural as appropriate from a fair and reasonable interpretation in the situation.

Referring now to the drawings, where the present invention is generally referred to with numeral 10, it can be observed that it basically includes a battery 12, a switch 14, a receiver 16, an antenna 18, a servo 20, a hand 22, fingers 24, a key 26, a flex rod 28, a frame 30, a knob 32, an antenna 34, a switch 36, a case 38 and a tensioner 40.

Figure 2:
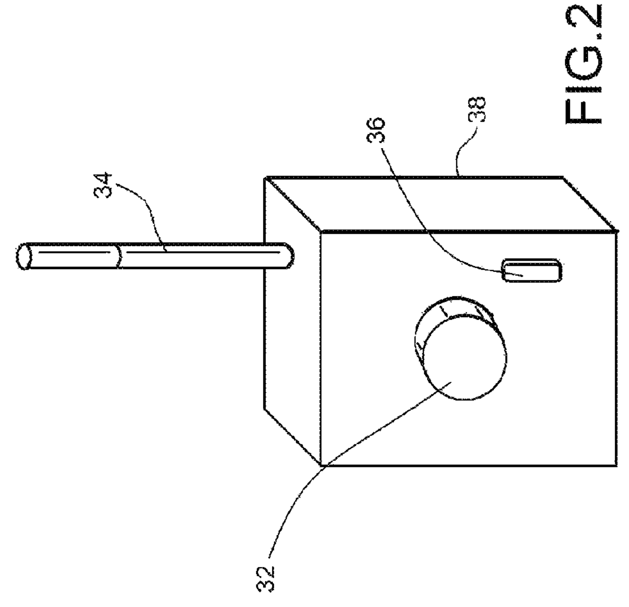
FIG. 2 shows a perspective view of a remote control assembly.

A preferred version of the device includes a key assembly, such as seen in FIG. 1, and a remote assembly, demonstrated in FIG. 2. Generally, the key assembly receives a wireless signal from the remote assembly and causes the key assembly to respond.

The key assembly is supported by the frame 30. Onto the frame 30 is affixed a battery 12 that supplies power to the key assembly. A switch 14 is provided to turn on the device or to disconnect the battery 12 from the balance of the components to reduce battery drainage while the device is not in use.

The battery 12 powers a wireless receiver 16. The receiver 16 listens for a signal from the remote assembly. An antenna 18 is optionally provided and attached to the receiver 16 to improve reception. The antenna 18 could be integrated into the flex rod 28, the frame 30 or the receiver 16 depending on the application of the device.

When the receiver 16 is powered on and detects a signal from the remote assembly the receiver 16 actuates the servo 20. In one variant of the device the servo rotates the hand 22 axially so that the fingers 24 connected to the hand 22 rotate the key 26 grasped by the fingers 24. Alternatives to the servo motion could be rocking back and forth or in and out. However, with a key 26 the axial rotation motion is preferred.

An example of a remote assembly is shown in FIG. 2. The case 38 may contain a battery and transmitter circuitry. When the switch 36 is manipulated the remote assembly is powered on or off. An optional antenna 34 is also depicted. An internal or low profile antenna can also be alternatively used.

Figure 3:
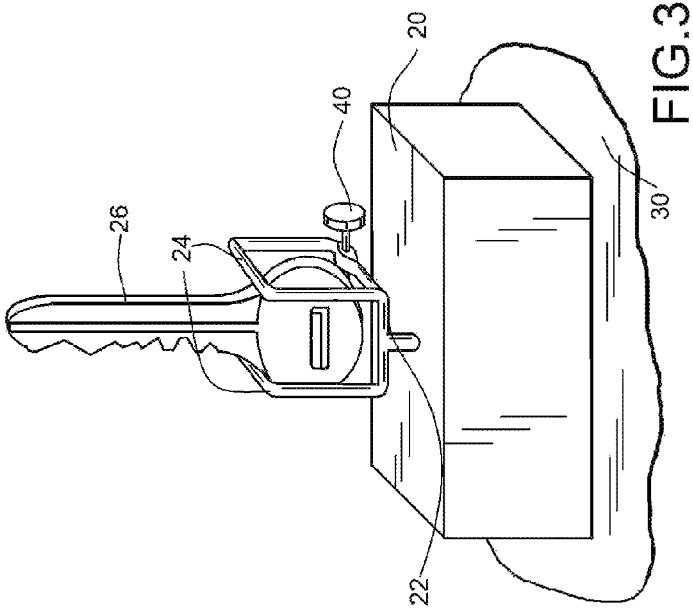
FIG. 3 shows a perspective view of a version of a servo assembly.

The knob 32 in FIG. 2 rotates axially in similar fashion to the servo 20 in FIGS. 1 and 3. When the knob 32 is rotated the remote assembly sends out a wireless signal that is received by the receiver 16 that in turn causes the servo 20 to rotate the key 26. In an important version of the device the direction and degree of rotation inputted to the knob 32 directly corresponds to the direction and degree of rotation delivered by the servo 20.

By way of example, if the user of the device rotates the knob 32 clockwise a quarter turn (ninety degrees) then the key 26 is likewise rotated a quarter turn in the clockwise direction. In this example, a quarter turn is about sufficient to turn a car ignition and start the car. Similarly the user can turn the knob 32 counter clockwise and turn the engine off or turn the ignition switch to accessory mode.

Looking at FIG. 3, a detailed view of a version of a servo assembly is shown. The key 26 is temporarily held by the fingers 24 around the head of the key 26. A tensioner 40 is optionally available to tension the pressure of the fingers 24 onto the key 26. The fingers 24 are connected to the hand 22 that is in turn connected to the servo 20 actuator motor.

The fingers 24 and hand 22 are preferably adapted to grasp a variety of objects including various shaped keys. Some keys are simply made of thin metal and other keys are thicker and include other materials and electronics. The fingers 24 and hand 22 may be replaceable depending on the application of the device to be able to effectively grasp an appropriate object.

The fingers 24 may be used to grasp objects other than a key for remote manipulation. For example, a switch or lever could be grasped by the fingers 24.

An electrician could use the device to turn a circuit breaker on or off remotely during a repair without having to walk repeatedly to a circuit breaker panel.

An auto mechanic could start a car while under the hood or while below a car on a lift during the course of maintenance. This could save time and reduce the need to raise and lower a lift. A single mechanic could perform a job at the same speed as previously was only possible with two mechanics.

A marine repairman can make adjustments in the bilge and use the device to turn on a pump or other accessory remotely at the helm or bridge. This can be done at large distances that are not possible with competing mechanically linked remote devices.

An audio technician can use the device attached to elevated lights to remotely adjust the levels or balance while the lights are difficult to reach on scaffolding.

A bedridden person could use the device to remotely control a radio or TV if unable to get up to do so. This would allow greater autonomy of the injured and a better quality of life.

Figure 4:
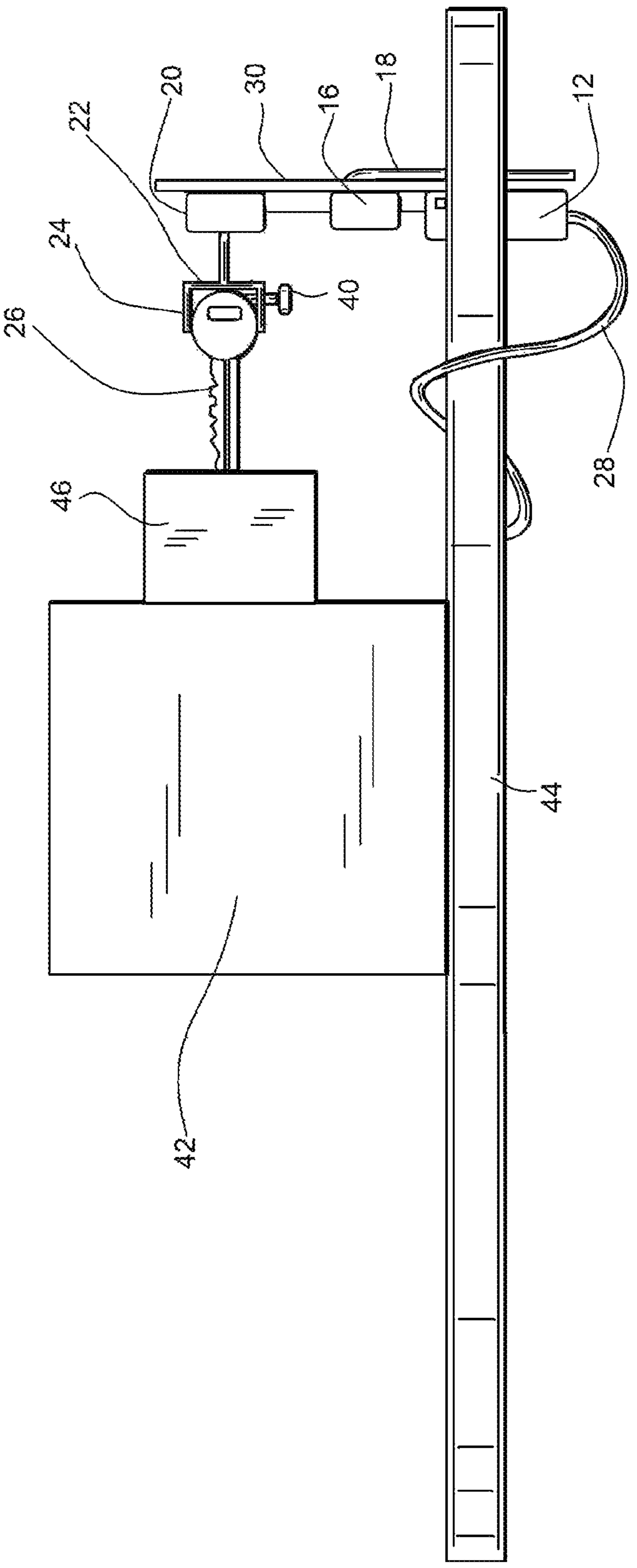
FIG. 4 shows a plan view of a remote switch controller as might be applied to a vehicle steering wheel.

FIG. 4 demonstrates one valuable use of the remote switch controller applied to a common automobile. In addition to the components described above, the vehicle includes a steering column 42, a steering wheel 44 and an ignition switch 46. In this view the key 26 is partially engaged into the ignition switch 46 but would typically be fully seated into the ignition switch manually by the user of the device upon initially setting it up.

When the key 26 is in the ignition switch 46 the flex rod 28 can be wrapped around an available object to secure the frame 30 and balance of the device. In this example in FIG. 4, the flex rod 30 is woven between the steering wheel 44 and spokes on the steering wheel. In this manner the flex rod 28 can be used to secure the device to a wide variety of objects to allow effective use for many different applications.

FIG. 4 would be useful for a mechanic who is working under a car and cannot easily slide out from under the car to start the engine while working on it. Previously, this task was done with a helper in the car or required the mechanic to slide out from under the car and start the engine or turn on ignition switch 46 to the accessory mode. In fact, the mechanic could do either from under the car by turning the knob 32 counter-clockwise to move the ignition switch 46 into accessory mode or clockwise to start the engine. Equally, if the engine was already started the mechanic could turn the knob 32 on the remote control assembly counter-clockwise to stop the engine.

Figure 6:
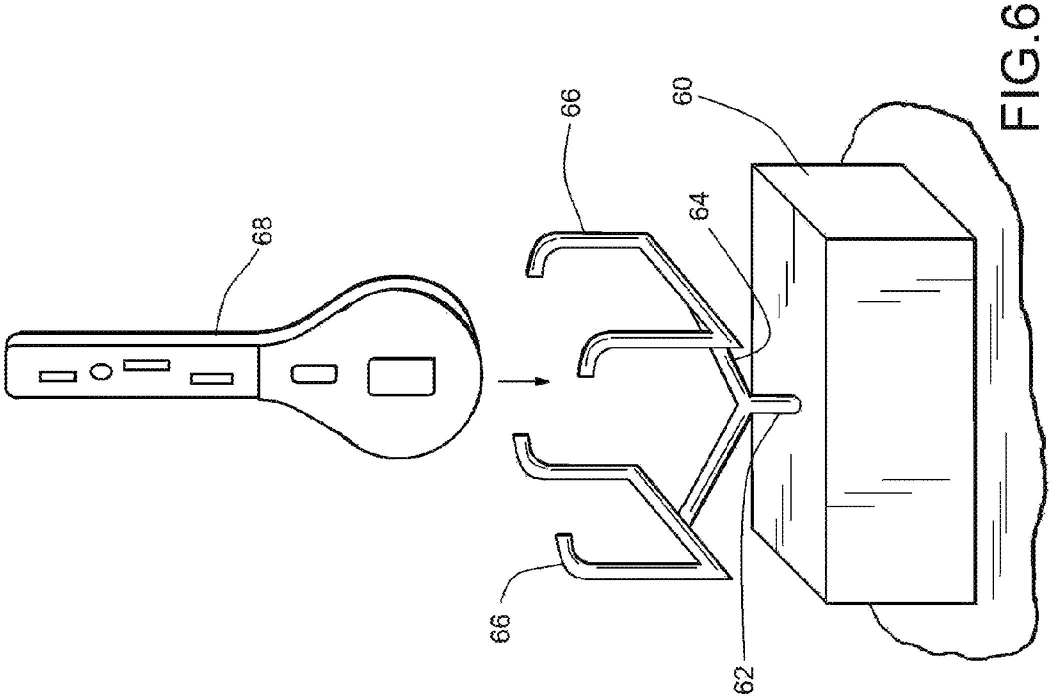
FIG. 6 shows a perspective view of an alternate version of a servo assembly.
Figure 5:
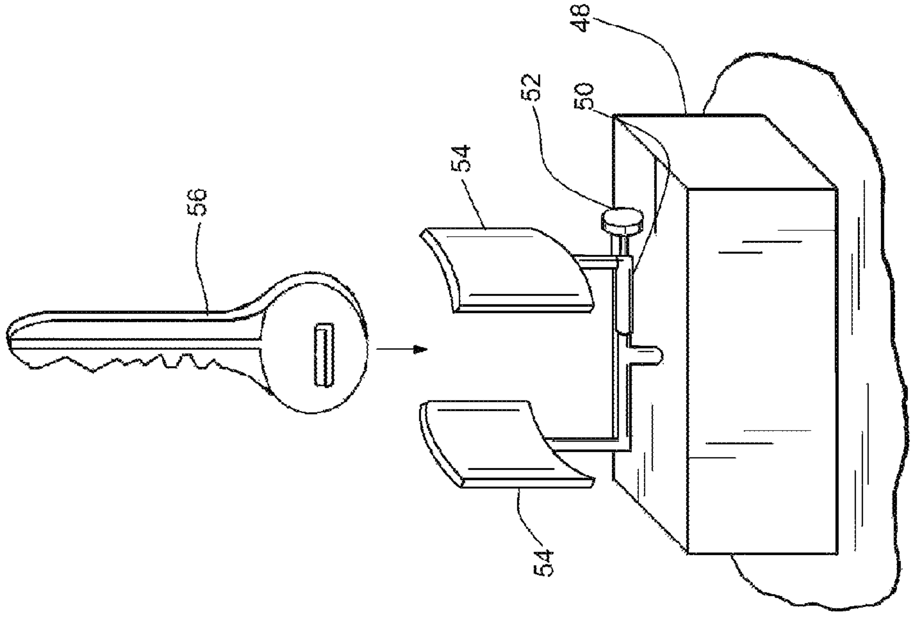
FIG. 5 shows a perspective view of an alternate version of a servo assembly.

FIGS. 5 and 6 show examples of different features related to servo assemblies that could be used in any of the versions of the device. Some features may be present in combination or separate from other elements shown depending on the specifics of the user's needs and application of the device. The alternate elements include, but are not limited to, a servo 48, a hand 50, a tensioner 52, fingers 54, a key 56, a servo 60, an axle 62, a hand 64, fingers 66, and a key 68.

FIG. 5 shows wider fingers 54 that might be useful for certain knobs and switches or for thicker electronic keys. The wide grip of the fingers can prevent damage to sensitive parts to be turned. The optional tensioner 52 can be used to close or open the hand 50 that in turn opens or tightens the fingers 54.

FIG. 6 is another example of a servo assembly that has, among other features, an alternate hand 64 and fingers 66 configuration. In this version the fingers 66 spring open and closed to grip an object such as a key 68 or other object to be manipulated. By nature of flexible materials of construction the hand 64 and fingers 66 can be forced apart to grab an object and the springy character of the flexible materials can apply force to the key 68 (or other object) to grasp it firmly.

A servo motor inside the servo assembly axially rotates the axle 62 that imparts torque onto the hand 64 then fingers 66 and ultimately the grasped object. The servo could also deliver other motions. For example, the servo could push in and out axially. This could be useful for pushing buttons. Or, the servo could flip back and forth. This could be useful for depressing a rocker switch or light switch.

In one version of the device the servo assembly is replaceable with alternate versions of servo assemblies. This allows the balance of components including the battery, receiver, frame, flex rod and other components to remain the same while increasing the adaptability of the device to work to hold different objects to be manipulated or to manipulate the object in different directions The hands 64 and fingers 66 could be rigid if adapted to a specific object to be manipulated. For example, the fingers might be specifically designed to hold a tool or knob. Magnetic fingers are also possible for some applications.

The flex rod 28 is generally constructed of a material that is flexible and can hold a shape when bent. Metal segmented tubes sometimes used on gooseneck lamps have been successful. Wire, sheathed, coated or bare that are flexible yet hold their shape when bend around a supporting object may also be used. The flex rod may include a clip, magnet or other attachment means to provide further support of the frame and servo. There may be more than one flex rod attached to the frame to lend strength additional attachment points. An example of an effective size of the flex rod for automotive applications has been about a half inch diameter and about twelve to thirty inches long. However, these dimensions are merely a guide and greater or smaller dimensions may be appropriate based on the application, material of the flex rod, torque (or other force) applied and weight of the device. Materials other than metal may be employed if they are flexible and retain shape when bent around a supporting structure or object.

The present invention can be fairly described as a remote switch controller comprising a remote control and a switch controller. The remote control includes, among other features, a battery, a knob and a transmitter. The switch controller includes, among other features, a flex rod, battery, a receiver and a servo all attached to a frame. The flex rod is flexible and retains a shape to which it is bent so that it can attach to a support structure, for example a steering wheel.

The servo imparts a motive force into a hand. The hand includes fingers that connect to an object, such as a key or switch. The transmitter communicates wirelessly to the receiver. When the knob receives a first input from a user the transmitter emits a first signal. When the receiver receives the first signal from the transmitter the receiver activates the servo to move the object in a first direction, for example turning a key clockwise. When the knob receives a second input from the user the transmitter emits a second signal. When the receiver receives the second signal from the transmitter the receiver activates the servo to move the object in a second direction, for example turning the key counter-clockwise.

The invention can also be fairly described as a method for remotely controlling a switch comprising a remote control and a switch controller. The remote control includes a battery, a knob and a transmitter. The switch controller includes a flex rod, battery, a receiver and a servo all attached to a frame. The servo is adapted to impart a force into a hand that is connected to a key, for example a rotational force to turn the key. The flex rod is flexible and retains a shape to which it is bent. The flex rod is bent around a steering wheel so that the key is held into an ignition switch. The transmitter is adapted to communicate wirelessly to the receiver. When the knob receives a first input from a user the transmitter emits a first signal. When the receiver receives the first signal from the transmitter the receiver activates the servo to rotate the key in a first direction. When the knob receives a second input from the user the transmitter emits a second signal. When the receiver receives the second signal from the transmitter the receiver activates the servo to rotate the key in a second direction.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A remote switch controller comprising a remote control and a switch controller;

the remote control includes a battery, a knob and a transmitter;

the switch controller includes a flex rod, a battery, a receiver and a servo all attached to a frame;

the flex rod is flexible and temporarily retains a shape to which it is bent to support the switch controller against a vehicle ignition switch;

the servo imparts a force into a hand;

the hand includes fingers that connect to a key;

the transmitter communicates wirelessly to the receiver;

when the knob is rotated by a user the transmitter emits a signal comprising a direction and a degree that the knob is rotated;

when the receiver receives the signal from the transmitter the receiver activates the servo to move the key in the direction and to the degree that the knob is rotated.

2. A method for remotely controlling an ignition switch comprising:

a remote control including a battery, a knob and a transmitter;

a switch controller including a flex rod, a battery, a receiver and a servo all attached to a frame;

the servo is adapted to impart a force into a hand that is connected to a key;

the flex rod is flexible and temporarily retains a shape to which it is bent to support the switch controller against the ignition switch;

the flex rod is bent around a steering wheel so that the key is held into the ignition switch;

the transmitter is adapted to communicate wirelessly to the receiver;

when the knob is rotated the transmitter emits a signal comprised of a direction of rotation and a degree of rotation;

when the receiver receives the signal from the transmitter the receiver activates the servo to rotate the key equally in the direction of rotation and the degree of rotation.

* * * * *